United States Patent [19]

Love

[11] 4,116,288

[45] Sep. 26, 1978

[54] METHOD AND APPARATUS FOR CONTINUOUSLY SEPARATING LOST CIRCULATING MATERIAL FROM DRILLING FLUID

[75] Inventor: William W. Love, Houston, Tex.

[73] Assignee: The Brandt Company, Houston, Tex.

[21] Appl. No.: 788,626

[22] Filed: Apr. 18, 1977

[51] Int. Cl.² .............................................. E21B 21/00
[52] U.S. Cl. ........................................ 175/66; 175/72; 175/206
[58] Field of Search ............................ 175/66, 72, 206

[56] References Cited

U.S. PATENT DOCUMENTS

| | | | |
|---|---|---|---|
| 2,576,283 | 11/1951 | Chaney | 175/66 |
| 3,221,825 | 12/1965 | Henderson | 175/72 |

*Primary Examiner*—Ernest R. Purser
*Attorney, Agent, or Firm*—Arnold, White & Durkee

[57] ABSTRACT

Method and apparatus for processing drilling mud wherein mud containing lost circulating material is passed from the well to a separator device where it is separated from the drilling mud and is reintroduced into the drilling mud after the mud has been cleaned of undesirable solid particulate. In the separator, the lost circulating material is retained on a coarse screen while the mud and drilling solids pass to a finer mesh screen. The finer mesh screen removes the drilling solids and allows the mud to pass to the mud tank. The separator includes structure to recirculate the lost circulating material to the mud tank.

13 Claims, 3 Drawing Figures

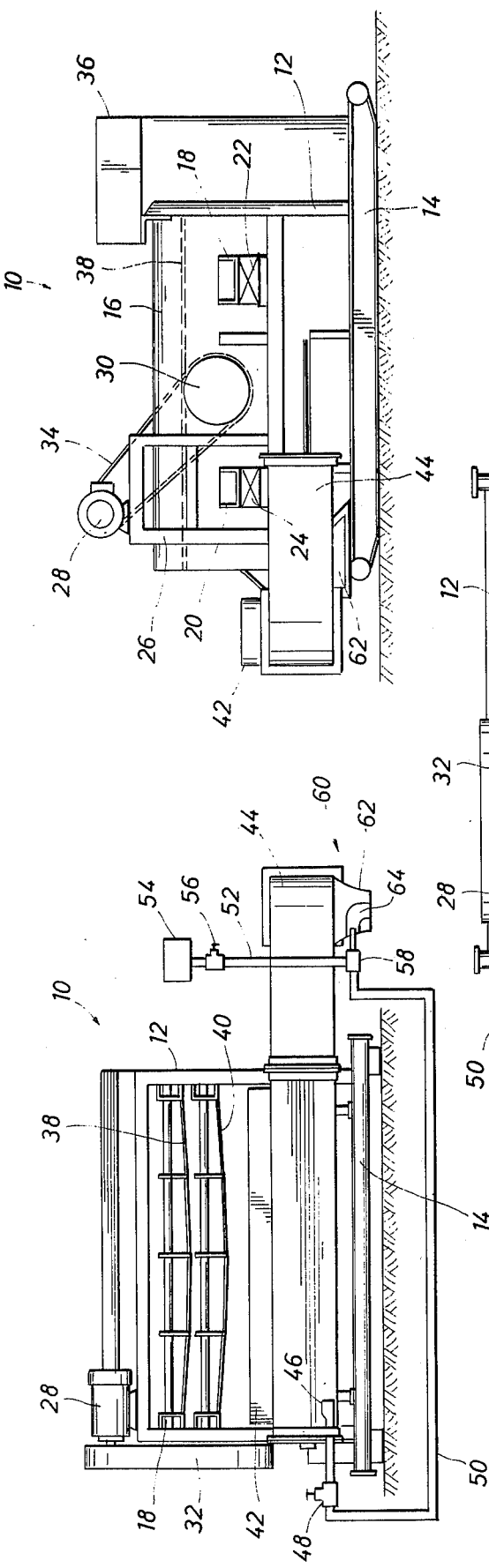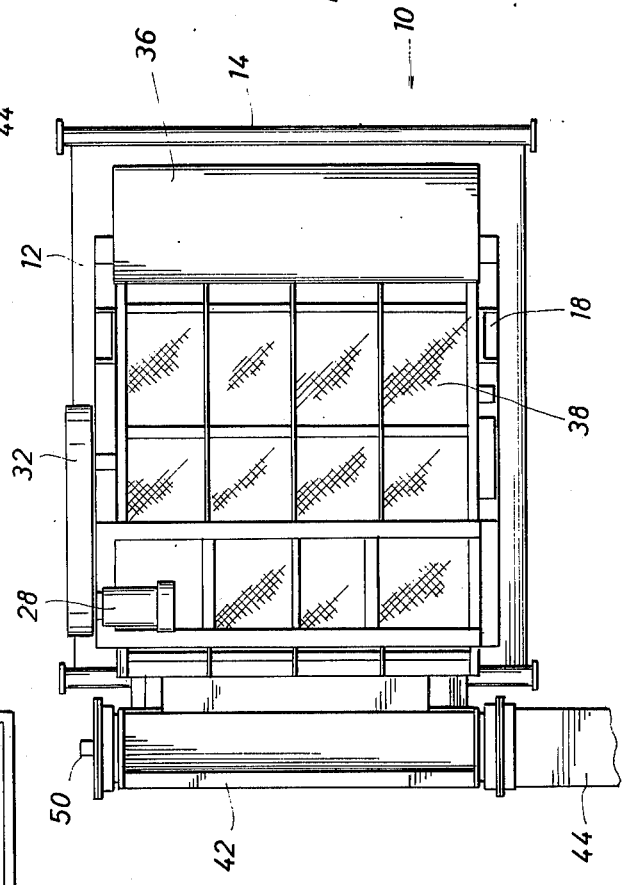

METHOD AND APPARATUS FOR CONTINUOUSLY SEPARATING LOST CIRCULATING MATERIAL FROM DRILLING FLUID

FIELD OF THE INVENTION

This invention relates generally to drilling mud systems incorporating means for separating undesirable particulate matter from drilling mud, and more specifically relates to a system for processing drilling mud that contains lost circulation material, while at the same time continuously circulating a mixture of drilling mud and lost circulation material into a well bore being drilled.

BACKGROUND OF THE INVENTION

In the drilling of deep wells, such as oil wells, a wide variety of earth formations may be encountered at various depths. In many types of earth formations, the formation will be sufficiently consolidated so at to be substantially impermeable to typical drilling mud systems. In some formations, however, it is possible for a substantial quantity of the drilling mud being circulated into the well bore to be lost into the formation. Losses of drilling fluid may be gradual where drilling fluid moves slowly into the formation, or circulation of drilling fluid may be lost entirely when large quantities of the drilling fluid escape into the formation from the well bore.

In the well drilling industry, formations, where partial or total lost circulation occurs, may be classified into four general classes. In one case, the formation may be unconsolidated or highly permeable, such as in the case of loose gravels, for example. In this case, the drilling fluid is slowly injected into the unconsolidated formation by the pressure of the mud system. Since drilling mud may be continually lost in unconsolidated formations, it must be continously replaced by adding more drilling mud to the system. It may be necessary, therefore, to increase the quantity of drilling mud that is ordinarily required for a typical well drilling operation, and this of course is highly undesirable and adversely affects the commercial nature of such well drilling operations.

Some formations have natural fractures that allow substantial quantities of the drilling fluid to flow into the fractures and become lost. It is desirable to seal these fractures and such sealing is conveniently accomplished by adding lost circulation material to the drilling medium so that the lost circulation material will bridge the fracture and provide a seal against further loss of circulation. In some cases, the pressure utilized for the drilling mud system causes natural fractures to widen, thereby compounding the problem of lost circulation.

In some cases, the earth formation is relatively soft and has sufficiently low structural integrity that the pressure of the drilling fluid system can cause the formation to fracture. When this occurs, it is of course necessary to develop a bridging seal at the fracture and provide a formation seal in the same manner as in the case of natural fractures.

In other cases, the earth formation may be referred to as a cavernous formation which may contain naturally occurring openings such as crevices and channels. When such anomalies are encountered during drilling operations, depending upon the particular size and quantity of the openings in the cavernous formation, circulation may be lost completely. The openings or channels may be of sufficient size that extremely large quantities of drilling mud may be lost if drilling is continued. Lost circulation material may be introduced into the drilling mud and may be injected into the well bore either in a slug or by continuous circulation. The lost circulation material enters the structural flaw or abnormality in the formation and causes a formation seal to be developed. The lost circulation material or bridging agents, as sometimes referred to, typically comprise a high filter loss slurry including bridging material that is typically in flake form. Cellophane material in flake or strip form has been utilized successfully as a bridging agent and walnut or pecan shells have also been employed. Many other fibrous or flake materials have also been successfully utilized as bridging agents.

When a condition of lost circulation occurs, drilling mud containing lost circulation material may be continuously circulated through the well bore, thereby causing substantial quantities of the lost circulation material to enter any abnormality in the formation along with drilling mud that is forced into the abnormality. This lost circulation material functions to bridge and seal the abnormality and limits or restricts further loss of drilling fluid into the abnormality. Where the formation is of relatively low structural integrity or is unconsolidated or highly permeable, it is not unusual for the circulating drilling mud to cause substantial erosion or sloughing of the formation. When this occurs, the drilling mud becomes laden with undesirable particulate and it is desirable that the particulate be removed prior to reinjection of the drilling mud into the well bore. It is also desirable, however, to retain the lost circulation material in the drilling mud system during continuous circulation. Screening the drilling mud in the usual manner for removal of undesired particulate matter will also cause removal of the lost circulation material. Such screening will therefore require continuous introduction of new lost circulation material to the drilling mud downstream of the mud screening operation. Correction of lost circulation conditions, when mud screening operations are also necessary or desirable, obviously result in very high drilling costs.

It is therefore a primary feature of the present invention to provide a novel method for processing drilling mud containing lost circulation material such that any undesirable particulate such as drill cuttings or sloughing material will be effectively separated from the drilling mud while at the same time the lost circulation material will be continuously circulated along with the drilling mud.

It is also a feature of the present invention to provide a novel system for processing drilling mud containing lost circulation material which allows continuous circulation of mud and lost circulation material without consequent depletion or use of substantial quantities of the lost circulation material.

It is another important feature of the present invention to provide a novel system for processing drilling mud and lost circulation material, whereby the lost circulation material is separated from the drilling mud immediately upon exit of the drilling mud from the well bore. The drilling fluid is cleaned of undesirable particulate and the lost circulation material is reintroduced into the mud system prior to reinjection of the drilling mud and lost circulation material back into the well bore.

It is a further feature of the present invention to provide a method of processing drilling mud and lost circulation material, whereby the lost circulation material bypasses a particulate separation system in its circulation along with the drilling mud relative to the well bore being drilled.

Among the several features of the present invention is noted the contemplation of novel mechanism for processing drilling mud containing lost circulation material, which mechanism continuously and automatically accomplishes separation of the lost circulation material exiting from the well bore, while at the same time cleaning the drilling mud of undesired particulate matter and reintroducing the previously separated lost circulation material into the cleaned drilling mud prior to reinjection of the drilling mud/lost circulation material into the well bore.

The present invention has as another important feature, the advantage of allowing continuous circulation of drilling mud and lost circulation material and continuous cleaning of particulate from the drilling mud without allowing substantial depletion of either the drilling mud or the lost circulation material, thereby accomplishing efficient and low cost well drilling operations and at the same time efficiently combating the problems of lost circulation and losses of drilling mud into the formation.

Other and further features and advantages of the present invention will become apparent to those skilled in the art upon consideration of the present disclosure. The form of the invention, which will now be described in detail illustrates the general principles of the invention, but it is to understood that this detailed description is not to be taken as limiting the scope of the present invention.

SUMMARY OF THE INVENTION

In accordance with the method of the present invention, drilling fluid exiting a well bore being drilled will incorporate lost circulation material of any suitable character when problems of circulation loss and/or loss of drilling fluid may be encountered due to particular anomalies in the earth formation being drilled. The exiting drilling mud will also typically incorporate a quantity of undesirable particulate material, such as drill cuttings and particulate that might slough from the walls of the well bore. It being undesirable to recirculate drilling mud containing such particulate, but desirable to recirculate drilling mud containing lost circulation material, the drilling mud exiting the well bore is first subjected to a coarse screening operation, whereby the coarse lost circulation material is separated from the drilling fluid medium and is conducted to a suitable receptacle therefor. With the lost circulation material removed from the particulate laden drilling fluid medium, the contaminated drilling fluid is subjected to a cleaning process. The drilling mud is screened by means of a vibratory screen apparatus, causing the drilling mud to flow through the screening apparatus while the undesirable particulate matter is separated from the drilling mud by the screens and is conducted from the screening apparatus for ultimate disposal. The cleaned drilling mud is then conveyed to suitable mud tanks for reinjection of the drilling mud into the well bore.

A quantity of previously cleaned drilling mud is utilized for hydraulic conveyance of the previously separated lost circulation material from the receptacle receiving it from the course screen to a convenient conduit for reintroduction of the lost circulation material into the flowing cleaned drilling mud medium. Upon reaching the pumping apparatus for injection of the drilling mud into the well bore, the lost circulation material will be reintroduced into the flow of drilling mud and the mud pumping system will therefore inject a mixture of drilling mud and lost circulation material into the well bore. The result is a continuous process, whereby cleaned drilling mud and lost circulation material is introduced into the well bore, while drilling mud, undesirable particulate, and lost circulation material continuously exit the well bore. The drilling mud is efficiently cleaned during the process of mud circulation.

Apparatus in accordance with the present invention may include vibratory screen apparatus for separating particulate matter such as drill cuttings and sloughing material from the drilling mud exiting from the well bore. Additionally, the screening system may incorporate an upper coarse screen system that accomplishes separation of lost circulation material from the drilling mud, but allows drilling mud, laden with particulate matter, to pass through the upper screen system and descend to the lower screen of the screening apparatus designed for vibratory separation of undesirable particulate matter from drilling mud. The upper coarse screen system may be subjected to oscillation for the purpose of causing the separated lost circulation material to traverse the upper screen system and become deposited in a receptacle or trough provided therefor. As the lost circulation material descends from the coarse screen system into the receptacle, a continuous flow of previously cleaned drilling mud may be utilized to flush the lost circulation material from this receptacle to an eductor system. The eductor system may utilize a flow of cleaned drilling mud to transport the drilling mud/lost circulation material slurry from the eductor to a line communicating with the suction of a mud pumping system. Prior to reaching the suction of the mud pump, the lost circulation material will be properly mixed with the drilling mud to form an appropriate slurry of drilling mud and lost circulation material for reintroduction into the well bore.

The coarse screening system for removal of lost circulation material from the drilling mud may form a part of a unitary vibratory screen separator apparatus or, in the alternative, the coarse screen system may comprise a separate unit that may be utilized in conjunction with conventional vibratory screen apparatus for separating undesirable particulate material from drilling mud.

BRIEF DESCRIPTION OF THE DRAWINGS

So that the manner in which the above recited featured advantages and objects of this invention, as well as others will become apparent, are attained, and can be understood in detail, more particular description of the invention, briefly summarized above, my be had by reference to the embodiment thereof which is illustrated in the appended drawings, which drawings form a part of this specification.

It is to be noted, however, that the appended drawings illustrate only a typical embodiment of the invention and are therefore not to be considered limiting of its scope, for the invention may admit to other equally effective embodiments.

IN THE DRAWINGS

The present invention, both as to its construction and manner of operation may best be understood by way of example, of a certain embodiment when taken in conjunction with the accompanying drawings in which:

FIG. 1 is an elevational view of vibratory screen apparatus constructed in accordance with the present invention and having the hydraulic lost circulation material transporting system thereof shown in partially schematic form.

FIG. 2 is a side elevational view illustrating the vibratory screen drilling mud processing system of FIG. 1.

FIG. 3 is a plan view illustrating the vibratory screen mud processing system of FIGS. 1 and 2.

DETAILED DESCRIPTION OF PREFERRED EMBODIMENT

Referring now to the drawings and first to FIG. 1, the method of the present invention may be effectively accomplished by means of a vibratory screen mud processing system identified genrally at 10 which incorporates a framework 12 suitably mounted upon a skid base 14. A vibratory screen housing 16 may incorporate a plurality of support elements such as shown at 18 nd 20 that are received by the upper portion of resilient elements 22 and 24, respectively, that are in turn supported by the framework 12. The resilient support elements 22 and 24 may comprise compression spring systems if desired, or in the alternative, may take any other suitable resilient form that allows substantial movement of the vibratory screen housing 16 relative to the framework 12. The framework 12 may incorporate a motor support structure 26 having an electric motor 28 or any other suitable motor element secured thereto. The motor 28 may be suitably connected to an eccentric weight device 30 that it is journaled for rotation by the vibratory screen housing. For example, the motor 28 may be connected to the rotatable eccentric weight 30 by means of a belt and pulley arrangement 34 that allows the eccentric weight to be driven by the motor. The motor, rotatable eccentric weight, and drive belt system may be received within a guard device 32 such as is shown in full lines in FIGS. 1 and 3 and shown in broken lines in FIG. 2. It is to be understood that the system 10 is skid mounted for the purpose of being placed over a conventional oil field mud tank. Thus, a feed hopper box 36 is provided for the purpose of receiving the mud from the well. The mud then overflows the hopper box 36 and falls into the screen structure where separation of the lost circulation material and drilling solids from the mud occurs. The clarified mud then decends into a mud receiver such as the mud tank (not shown), whereupon the mud is capable of being recirculated to the well bore minus the solids. The lost circulating material is reintroduced into the flow of cleaned drilling mud before injection of the mud and lost circulation material composition as described hereinafter.

With reference again to FIG. 1, there will be seen a first substantially horizontally mounted coarse screen 38 and a second fine screen 40. The coarse screen functions to retain the lost circulating material but to pass the mud and drilling solids. This mixture of mud and drilling solids minus the lost circulating material fall onto fine screen 40 where the drilling solids are retained while the clarified mud effluent is allowed to descend to a mud receiver, such as the mud tank for ultimate recirculation to the well bore. While only a single fine screen 40 is shown, obviously plural screens may be provided where progressive separation is desired. As noted above, both the coarse and fine screens 38 and 40 are mounted for vibration in order to enhance separation and in order to direct the separated lost circulation materials to a discharge trough or receptacle and to direct the separated drill solids to an appropriate receiver for ultimate disposition. Thus, in FIG. 3 for example, the numeral 42 indicates the trough for receiving the separated lost circulating material that is vibratorily ejected from the coarse screen 38. Hence, as screen 38 vibrates, the lost circulating material is both removed from the mud and solids and urged along screen 38 towards trough 42 which receives the lost circulating material as it falls from screen 38. A similar trough (not shown) may be provided for receiving the solids from fine screen 40 and for directing these undesirable separated solids to a convenient disposal site.

In the interest of clarity, the system for recirculating the lost circulating material has been illustrated in detail only in FIG. 1. Thus, there will be seen therein trough 42 for receiving the lost circulation material from coarse screen 38. Trough 42 communicates at one of its ends with a blind conduit 44. At the other end of trough 42 there is provided a reducer flow element 46 controlled by valve 48. Flow lines 50 and 52 provide the communication between the reducer 46 and a source of clean mud illustrated generally at 54. The clean mud source 54 could for example, be a return line from the mud tank, the only essential feature being that clean mud be introduced into reducer unit 46 in order to force the lost circulating material along trough 42 and into conduit 44. Another suitable valve 56 may be provided in flow line 52 to control the flow of clean mud from source 54.

Connected to the lower end of flow line 52 there will be seen a flow divider device 58, such as a "T" connection, which functions to direct one clean mud stream to reducer 46 and to direct a second stream of clean mud towards eductor unit 60. Eductor unit 60 will be seen to comprise a funnel like hopper 62 disposed in the bottom portion of conduit 44 and being open at both its upper and lower ends. Thus, lost circulating material forced along trough 42 by the clean mud introduced at reducer 46 will fall into hopper 62 and exit hopper 62 at its open lower end. To facilitate discharge of the lost circulating material from the hopper 62, there is provided an injector unit 64 within hopper 62 and being in communication with the other of the clean mud streams from divider device 58. Thus, as clean mud passes from divider 58 and through injector 64, there is provided a low pressure area within hopper 62 that effectively assists in the drawing into and discharge of the lost circulating material from the hopper. The lost circulating material thereupon falls into the mud tank (not shown) along with the clarified effluent mud that passes through fine screen 40. Hence, the lost circulating material is effectively recirculated back with the clean mud, and from the mud tank both the lost circulating material and clean mud are again directed back to the well bore for reuse. A further advantageous feature of the injector unit 64 resides in the fact that it not only acts to draw the lost circulating material into and through hopper 62, but also functions as a mixer by causing circulation of the materials in the mud tank into which it is being directed. This effectively assists the comingling again of the clean mud with the lost circulating material.

In operation of the device above described, the system 10 is mounted above the mud tank with the skids 14 resting on at least two walls of the mud tank. Drilling mud from the well bore containing drilling solids and lost circulating material is pumped from the well bore to feed hopper box 36. The materials overflow onto coarse screen 38 which retains the lost circulating material but allowing the mud and drilling solids to pass therethrough. On fine screen 40, the drilling solids are retained and cleaned mud falls into the mud tank free of the lost circulating material and solids. Vibration of screens 38 and 40 causes the materials thereon to be moved to disposal. Thus, the lost circulating material is advanced to the edge of screen 38 where it falls into receptacle 42. Clean mud source 54 is actuated and the flow of clean mud through reducer 46 moves the lost circulating material towards and into hopper 62. From hopper 62, the lost circulating material is returned to the mud tank to rejoin the clean mud for circulation again from the mud tank and back to the well bore. The action of clean mud from injector 64 assists the passage of the lost circulation material through the hopper 62 and into the mud tank and effectively comingles the clean mud with the lost circulation material for return from the mud tank to the well bore.

Many other modifications and alternatives to the apparatus and techniques hereinbefore described will be readily apparent to those of ordinary skill in this art. Accordingly, the structures and techniques described herein and depicted in the accompanying drawings are intended to be exemplary only and are not intended as limitations on the scope of this invention.

What is claimed is:

1. A method of drilling well bores in formations having the characteristic of causing loss of circulating drilling fluid into the formation being drilled, said method comprising the steps of:
    (a) providing drilling fluid and circulating the same in said well bore;
    (b) continuously introducing lost circulation material into said circulating drilling fluid and circulating said lost circulation material along with said drilling fluid;
    (c) continuously separating said lost circulation material from the drilling fluid containing undesirable particulate matter and lost circulation material exiting the well bore;
    (d) subsequent to step (c), continuously separating at least a majority of the undesirable particulate matter from said drilling fluid to produce cleaned drilling fluid;
    (e) reintroducing said lost circulating material into said cleaned drilling fluid; and
    (f) continuing with circulation of said drilling fluid and lost circulation material in the well bore being drilled.

2. The method recited in claim 1, wherein:
said continuously separating said lost circulation material from the drilling fluid is accomplished by passing said drilling fluid through a screen that is sufficiently coarse to allow substantially all of the drilling fluid and particulate matter to pass therethrough while preventing said lost circulation material from passing therethough.

3. The method recited in claim 2, wherein:
said screen oscillates during said drilling operations to cause said lost circulation material to be ejected from said screen.

4. The method recited in claim 3, wherein said method includes:
depositing said lost circulation material ejected from said screen into receptacle means.

5. The method recited in claim 4, wherein said method includes:
removing said lost circulation material from said receptacle means by flushing the receptacle means with cleaned drilling fluid.

6. The method recited in claim 1, wherein reintroduction of said lost circulation material into said drilling fluid is accomplished by:
mixing a quantity of cleaned drilling fluid with the lost circulation material ejected from said screen to form a slurry containing cleaned drilling fluid and lost circulation material; and
hydraulically transporting said slurry into said circulating drilling fluid.

7. Apparatus for drilling well bores in formations having the characteristic of causing loss of circulating drilling fluid into the formation being drilled, said apparatus comprising:
means for receiving drilling fluid containing undesirable particulate matter and lost circulation material exiting the well bore;
first separating means associated with said means for receiving and comprising means for continuously separating said lost circulation material from said drilling fluid to provide a semi-cleaned drilling fluid;
second separating means comprising an oscillating screen means for separating undesirable particulate matter from said semi-cleaned drilling fluid to provide a cleaned drilling fluid;
means receiving said cleaned drilling fluid from said oscillating screen means;
means receiving said lost circulation material separated from said drilling fluid by said first separating means; and
means for reintroducing said lost circulation material into said cleaned drilling fluid and reintroducing said lost circulation material and cleaned drilling fluid into said well bore.

8. Apparatus as recited in claim 7, wherein said means for continuously separating said lost circulation material from said drilling fluid comprises:
perforate means defining openings of sufficient size to allow said drilling fluid and particulate matter to flow through said openings and preventing said lost circulation material from flowing through said openings.

9. Apparatus as recited in claim 7, wherein said means for continuously separating said lost circulation material from said drilling fluid comprises:
perforate means defining openings of sufficient size to allow said drilling fluid and particulate matter to flow through said openings and preventing said lost circulation material from flowing through said openings; and
means for oscillating said perforate means to cause said lost circulation material to be ejected from said perforate means.

10. Apparatus as recited in claim 9, wherein:
said means for receiving said lost circulation material from said perforate means comprises a receiving trough;
said apparatus includes first hydraulic means connected to said receiving trough, said first hydraulic means continuously mixing said lost circulation material with cleaned drilling fluid; and
said means for reintroducing said lost circulation material into said well bore comprises second hydraulic means connected to said receiving trough and being operative to transport cleaned drilling fluid and lost circulation material from said receiving trough and to introduce the same into the circulating drilling fluid.

11. Apparatus as recited in claim 7, wherein said oscillating screen means includes:
at least one screen element positioned to receive drilling fluid and particulate material from said first separating means; and
vibratory means for imparting vibratory oscillation to said screen element causing said screen element to separate at least a major portion of said particulate material from said drilling fluid and causing cleaned drilling fluid to flow through said screen element, said vibratory oscillation causing said separated particulate material to be ejected from said screen element; and
wherein said apparatus includes means for receiving particulate material ejected from said screen element; and
wherein said means for continuously separating said lost circulation material from said drilling fluid comprises perforate means connected to said vibratory means for vibratory oscillation along with said screen element.

12. Apparatus as recited in claim 11, wherein said perforate means comprises:
an upper screen element having sufficiently large screen openings such that said lost circulation material will be retained by said upper screen element whereby said drilling fluid and particulate matter will flow through said upper screen element and descend to said screen element.

13. In a method of drilling well bores in formation having the characteristic of causing loss of circulating drilling fluid wherein lost circulation material is added to the drilling fluid, the improvement comprising:
continuously removing the lost circulation material from the drilling fluid exiting the bore hole and depositing such drilling fluid on a first relatively coarse screen;
allowing semi-cleaned drilling fluid containing lost circulation material and particulate matter to fall to a second screen positioned below said first screen, said second screen having a finer mesh to retain the particulate matter thereon while passing cleaned drilling fluid to storage;
collecting the particulate matter from the second screen;
continuously oscillating said first screen to cause the lost circulation material to fall from a selected portion of the screen into a recovery receptacle;
introducing a flow of cleaned drilling fluid into an input port of said receptacle;
recovering a mixture of cleaned drilling fluid and lost circulation material from an exit port of said receptacle; and
conveying said mixture to a point where it is reintroduced into the circulating drilling fluid.

* * * * *